Jan. 8, 1952          H. R. DEAN          2,582,108

MOWER AND WINDROWER

Filed Oct. 13, 1948          5 Sheets-Sheet 1

Inventor
Harold R. Dean
By his Attorneys
Merchant & Merchant

Jan. 8, 1952        H. R. DEAN        2,582,108
MOWER AND WINDROWER

Filed Oct. 13, 1948        5 Sheets-Sheet 5

Inventor
Harold R. Dean
By his Attorneys
Merchant & Merchant

Patented Jan. 8, 1952

2,582,108

UNITED STATES PATENT OFFICE 2,582,108

MOWER AND WINDROWER

Harold R. Dean, Bird Island, Minn.

Application October 13, 1948, Serial No. 54,225

2 Claims. (Cl. 56—23)

My invention relates to improvements in mechanical harvesting devices and, more particularly, to a device for mowing swathes of grain, hay, or the like and depositing them in orderly windrows.

The primary object of my invention is the provision of a device of the type above-described, which can be readily attached to and removed from a conventional farm tractor, and which may utilize the power take-off thereof for operation of the cutter bar reel and conveyor incorporated therein.

Another important object of my invention is the provision of a device of the class described, incorporating novel means for quickly and easily changing the elevation of the reel thereof with respect to the mower bar thereof.

Another object of my invention is the provision of a device of the class described, wherein the reel may be adjustably positioned forwardly or rearwardly with respect to the cutter bar.

Still another object of my invention is the provision of manual means for imparting rocking movements to the entire structure for changing elevation of the cutter bar with respect to the ground.

A still further highly important object of my invention is the provision of a device of the class described, which is relatively inexpensive to build, and which is rugged in construction, durable in use, and easy to operate.

The above and still further highly important objects and advantages of my invention will become apparent from the following detailed specification, appended claims, and attached drawings.

Referring to the drawings, wherein like characters indicate like parts throughout the several views:

Fig. 6 is a fragmentary detail, partly in front elevation and partly in section, taken substantially on the line 6—6 of Fig. 4;

Fig. 7 is an enlarged fragmentary detail, partly in plan and partly in section, taken substantially on the line 7—7 of Fig. 2;

Fig. 8 is an enlarged fragmentary detail as seen from the line 8—8 of Fig. 4;

Fig. 9 is an enlarged fragmentary detail, as seen from the line 9—9 of Fig. 4, some parts being broken away;

Fig. 10 is an enlarged fragmentary section, taken substantially on the line 10—10 of Fig. 3; and Fig. 11 is a fragmentary view, partly in end elevation and partly in section, taken on the line 11—11 of Fig. 10, some parts being broken away.

Figure 1:
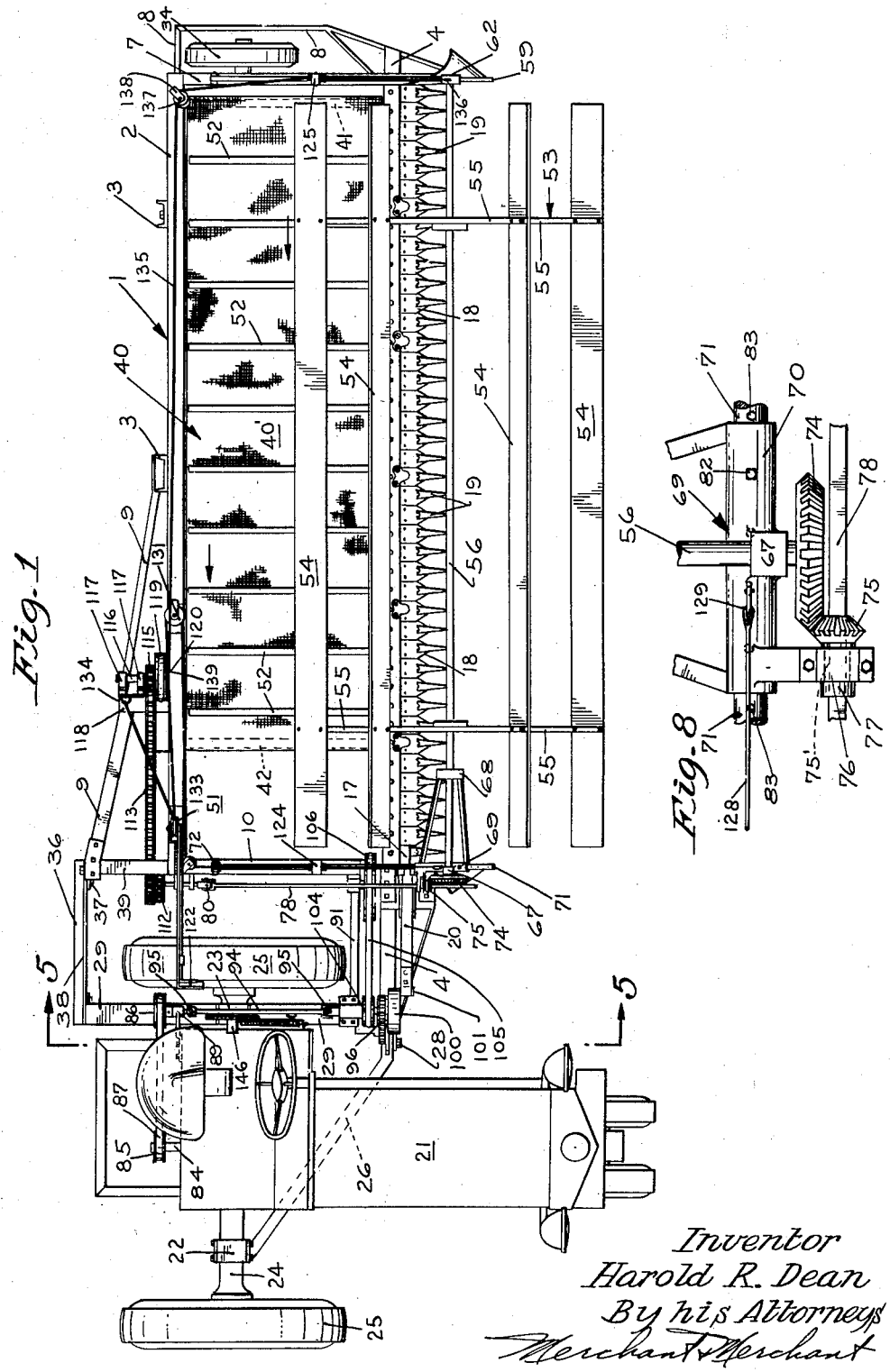
Fig. 1 is a view in plan of my novel device secured to a conventional farm tractor.

Referring with greater particularity to the drawings, the numeral 1 indicates, in its entirety, a substantially rectangular frame comprising longitudinally-extending rear frame members 2 connected by longitudinally-spaced vertically-disposed frame members 3, a longitudinally-extending front frame member 4, and inner and outer end frame members 5 and 6 respectively. At its outer or free end, the frame 1 is reinforced by a rearwardly-inclined brace member 7 and a horizontally-disposed bracing 8. The inner end of the lower rear frame member 2 is longitudinally spaced from the transverse frame member 5 but is rigidly connected therewith and with the extreme inner end of the upper rear frame member 2 by angularly-disposed brace members 9 and a transverse frame member 10. The frame member 10 is in vertically-spaced parallel relation to the inner end frame member 5 and is connected thereto by vertically-disposed bars or frame members 11 and 12. An end wall 13 formed from sheet material or the like is welded or otherwise secured to the end frame members 5, 10, 11, and 12; and a vertically-disposed rear wall 14 extends longitudinally of the frame 1 from the outer frame elements 6 to the inner end of the frame element 2. A vertically-disposed brace 15 extends from the inner end of the lower frame member 2 to an intermediate portion of the upper frame member 2 and defines one end of an opening 16, the purpose of which will hereinafter become apparent.

A conventional cutter bar or mower bar 17 is provided with knives 18 and is mounted for reciprocating movements longitudinally of the frame 1 adjacent the leading edge of the frame member 4. The mower bar 17 works within the conventional fingers or guards 19 which project forwardly of the frame member 4. The inner end of the mower bar 17 is connected to driving means, hereinafter to be described, by a pitman arm 20.

At its inner end, the frame is secured to a tractor 21 in the following manner. A pair of anchoring members or brackets 22 and 23 are secured fast to the axle housing 24 of the tractor 21, one each adjacent one of the pneumatic tire-equipped driving wheels 25 thereof. A rigid angular brace member 26 is pivotally connected at one end to the anchoring bracket 22, as indicated at 27, and at its other end to the extreme inner end of the longitudinal frame member 4, as indicated at 28. An inner end member 29 is rigidly secured to the inner end portion of the front frame member 4 and extends rearwardly therefrom, terminating at the vertical plane of the rear end of frame member 10. At its intermediate portion, the brace member 29 is provided with an upwardly-extending plate-like flange 30 which is pivotally connected to a depending portion 31 of the anchoring bracket 23 by a nut-equipped bolt 32.

Figure 5:
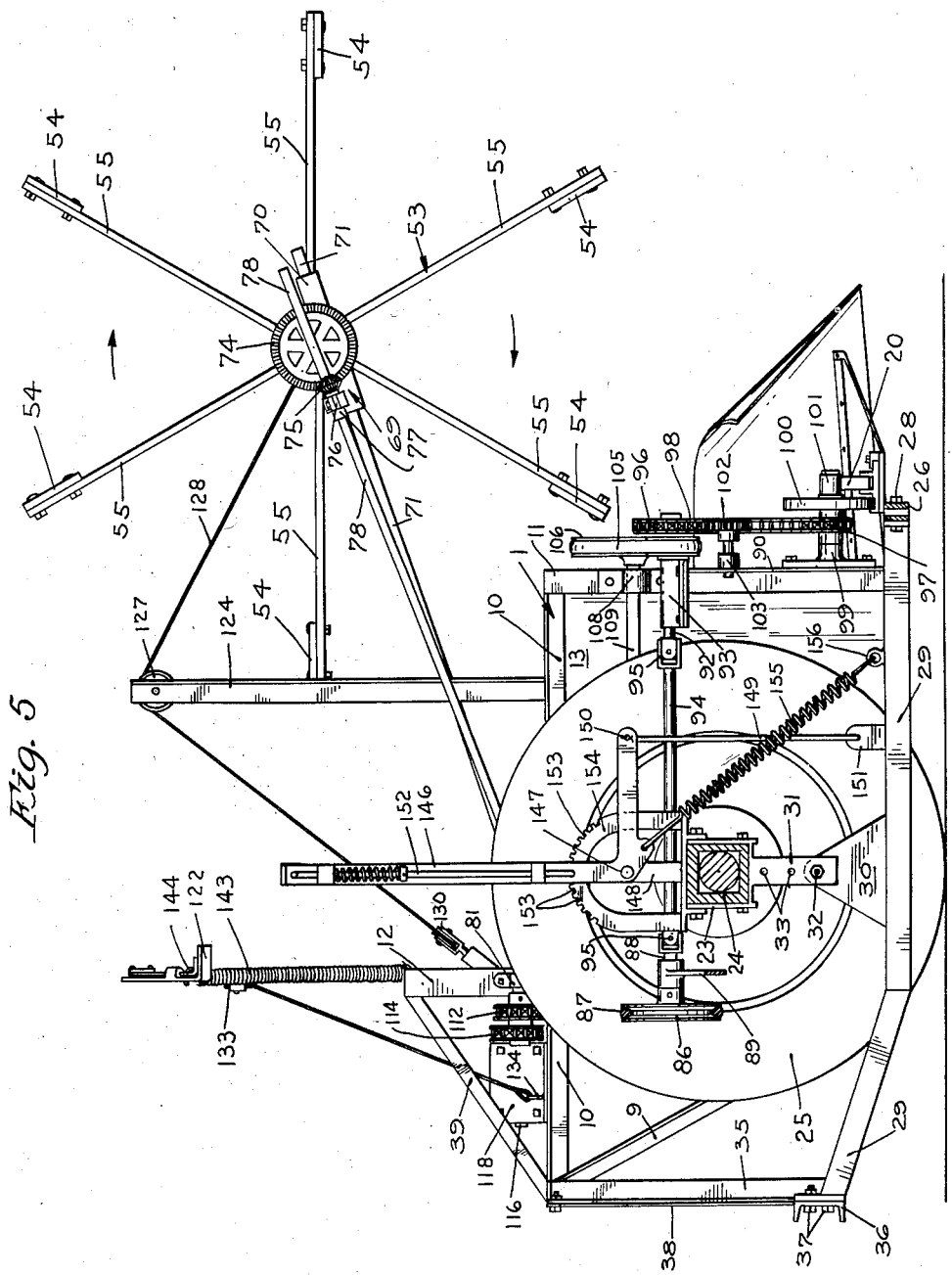
Fig. 5 is an enlarged view in vertical section, taken substantially on the line 5—5 of Fig. 1.

It will be observed by reference to Fig. 5 that the depending portion or legs 31 of the anchoring bracket is provided with a plurality of apertures 33 through any one of which the bolt 32 is adapted to extend depending upon the elevation to which it is desired to maintain the frame 1. Although not shown, it may be assumed that the pivotal connection 27 between the brace member 26 and the anchoring bracket 22 may be likewise vertically adjustable. At its outer or free end, the frame 1 has journalled thereto, by suitable means not shown, a tire-equipped ground wheel 34, which may also be assumed to be vertically adjustable with respect to the frame 1 so that the free end thereof may be maintained at substantially the same level as the inner end thereof. A vertically-disposed post 35 is rigidly connected at its upper end to the extreme rear end of the frame member 10, the lower end thereof terminating substantially at a level with the rear end of the inner end member 29. A relatively heavy beam 36 extends from the lower end of the post 35 to the rear end of the inner end member 29 and is removably secured to each thereof by means of nut-equipped screws or the like 37. An angular brace 38 has its lower end rigidly secured by welding or the like to one end of the beam 36 and its other end detachably secured to the upper end of the post 35 adjacent its connection with the frame member 10. Removal of the beam 36 and its cooperating brace 38 permits the adjacent tractor drive wheel 25 to be easily moved into a position between the inner end portion of the frame 1 and the inner end member 29, so that the frame may be easily and quickly connected to the tractor 21. The beam 36 affords a rigid brace between the rear end of the frame 1 and its connection to the tractor 21. Further rigidity is imparted to the frame 1 at its inner end portion by an angular brace 39 extending from the rear end of the frame member 10 to the upper end of the vertically-disposed end frame member 12.

Figure 2:
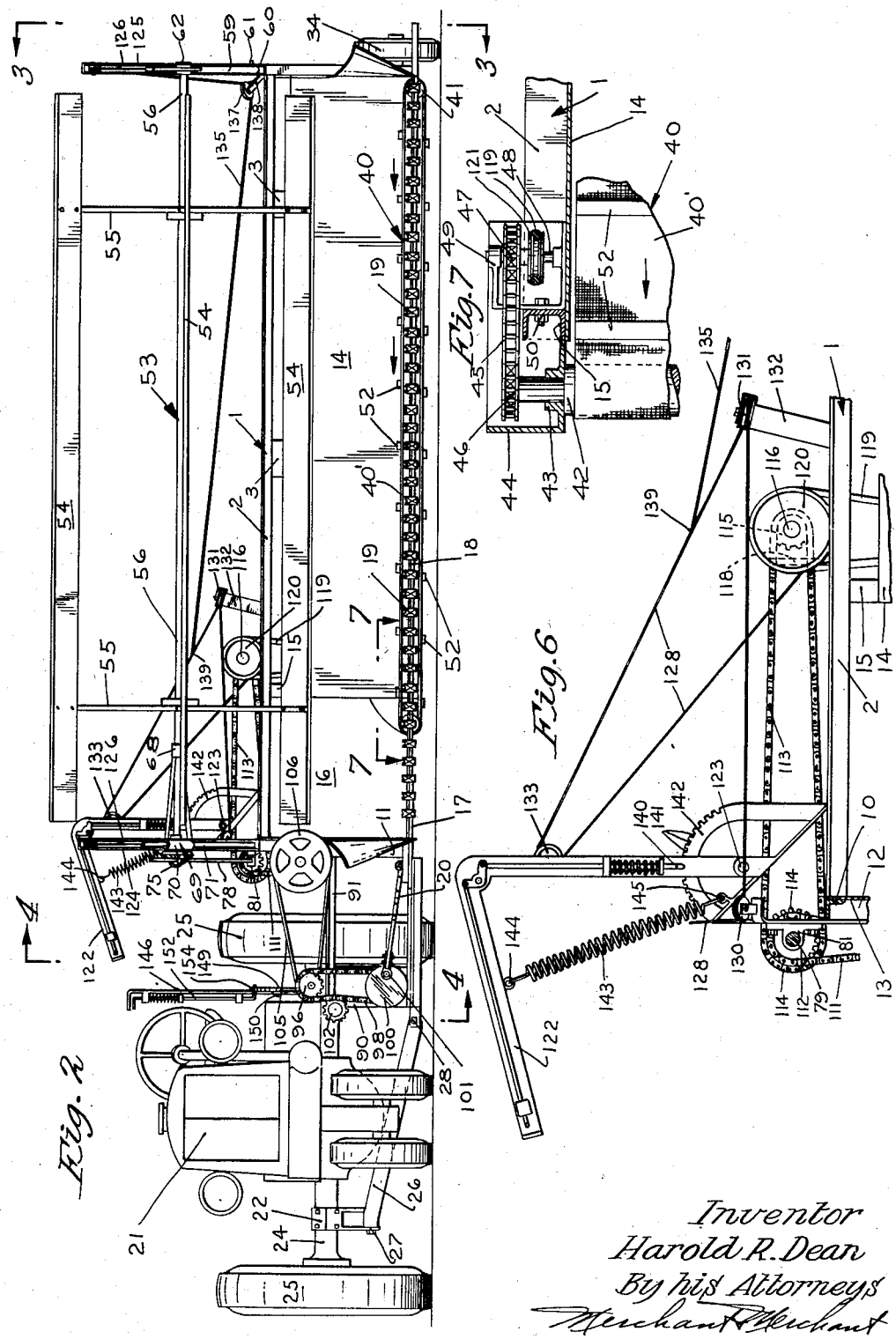
Fig. 2 is a view in front elevation thereof.

The otherwise open bottom of the frame 1 is covered for the greater part of its length by an endless conveyor 40 which runs over an idler roller 41 extending transversely of the frame 1 and journalled in suitable bearings at the extreme outer end thereof. The conveyor runs over a driving roller 42 in spaced parallel relationship to the idler roller 41 adjacent the inner end of the rear wall 14. The forward end of the driving roller 42 is journalled in a suitable bearing not shown but connected to the longitudinal frame member 4 and at its rear end in a bearing boss 43 integrally formed with a guard bracket 44 welded or otherwise secured to the vertically-disposed brace 15. A driving chain 45 runs over a sprocket 46 fast on the rear end of the driving roller 42 and a sprocket 47 fast on a jack shaft 48 which is journalled at its opposite ends in a bearing bracket 49 secured by nut-equipped bolts or the like 50 to the vertically-disposed brace 15 (see Fig. 7). It will be observed, particularly by reference to Figs. 1 and 2, that the conveyor 40 extends longitudinally of the frame 1 and that the upper or delivery run thereof lies immediately behind the mower structure. It will also be noted that the conveyor 40 terminates at its inner end in spaced relation to the inner frame member 5 whereby to provide an outlet opening 51 which cooperates with the opening 16 between the inner end of the vertical rear wall 14 and the inner frame structure to provide an outlet for grain or like material as the device traverses a field. The conveyor 40 is made from conventional materials, the belt 40' thereof being made from canvas or the like and provided with spaced flights or slats 52, preferably made from wood.

Figure 3:
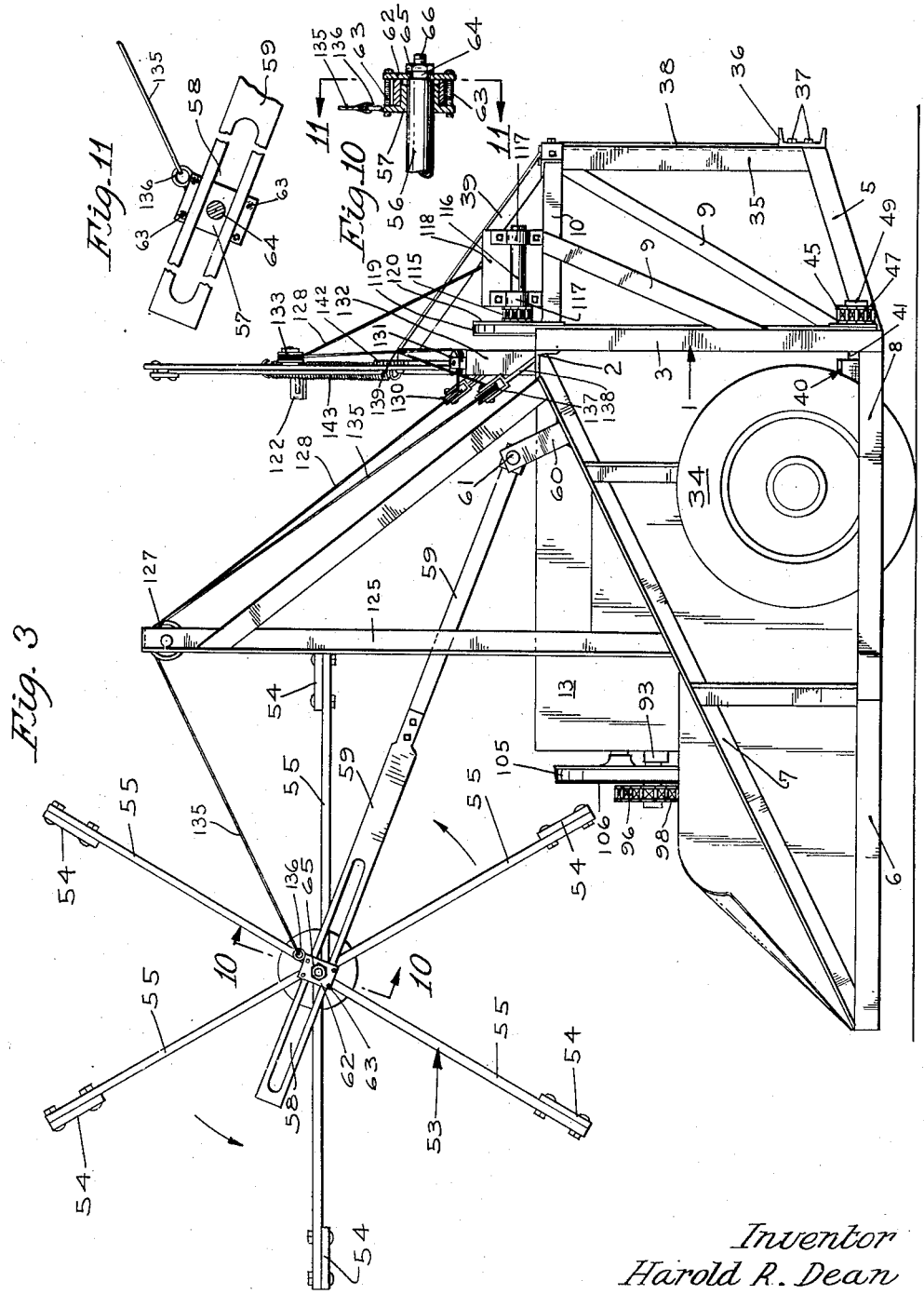
Fig. 3 is a view in end elevation of my improved device on an enlarged scale, as seen from the line 3—3 of Fig. 2.

I provide a reel indicated in its entirety by the numeral 53 and comprising a plurality of circumferentially-spaced blades 54 rigidly secured to the outer ends of radially-extended pairs of arms 55 secured fast at their inner ends to a shaft 56. It will be seen, particularly by reference to Figs. 1 and 2, that the blades 54 are of substantially the same length as the mower bar 17 and that the radially-extended arms 55 are disposed adjacent the opposite ends of the blades 54. The shaft 56 and blades 54 of the reel 53 extend longitudinally of the frame 1 and overlie the mower structure as is customary with machines using this equipment. At its outer end, the shaft 56 is journalled in a bearing 57 which is slidably mounted in a slot 58 of an arm 59 which is pivotally secured at its inner end to a bracket 60, as indicated at 61. The bracket 60 is welded or otherwise rigidly secured to the rearwardly-inclined brace member 7 (see particularly Figs. 3, 10, and 11). The bearing 57 is frictionally locked in desired set position by means of a clamping plate 62 and clamping screws 63. It will be seen, particularly by reference to Fig. 10, that the shaft 56 has a diametrically-reduced portion 64 which passes loosely through an opening in the plate 62 and is held against axial movements with respect thereto by means of a nut 65 screwed on to the threaded extreme end 66 of the shaft 56. The clamping arrangement shown permits the outer end of the reel to be frictionally locked against sliding movements longitudinally of the arm 59, in any desired position within the limits of the slot 58, so that the outer end portion of the reel may be properly located forwardly or rearwardly with respect to the mower structure.

The inner end of the shaft 56 is journalled in spaced bearing bosses 67 and 68 on a bearing bracket 69. The bearing bracket 69 has a tubular portion 70 which is slidably mounted on an arm 71, the inner end of which is pivotally secured to a bracket 72, as indicated at 73. The bracket 72 is secured fast to the intermediate portion of the transverse frame member 10 (see particularly Fig. 9). A bevel gear 74 is secured fast to the extreme inner end of the reel shaft 56 and has meshing engagement with a bevel pinion 75 that is journalled for rotation in a bearing 76 extending outwardly from the bearing bracket 69. The pinion 75 has a reduced neck portion at the hub 77 thereof which is contained within the bearing 76 and held thereby against axial movement. The pinion 75 is provided with an axially-extended rectangular opening 75' of a size to axially slidably receive a cross-sectionally rectangular driving shaft 78. Shaft 78 is freely slidable in the opening 75' but fits said opening with sufficient accuracy to lock the pinion 75 against rotary motion with respect thereto. Shaft 78, at one end, is coupled to a relatively short shaft 79 through a universal joint 80. Shaft 79 is journalled in a pair of bearings 81, one thereof secured to the bracket 72 and the other thereof secured to the vertically-disposed frame member 12. Adjustment of the bracket 69 with respect to the pivot 73 is accomplished by the insertion of a pin or bolt 82 through an aperture in the tubular portion 70 of the bracket 69 and any one of a plurality of spaced apertures 83 in the arm 71. This arrangement, together with the clamping of the bearing 57 on the arm 59 permits the reel 53 to be disposed in any desired position forwardly or rearwardly with respect to the mower structure and in parallel relationship thereto.

Mower bar 17 is driven from the power take-off of the tractor 21 through connections which include the pitman arm 28. A power take-off shaft shown in Fig. 1 and indicated by the numeral 84 is provided with a pulley 85 over which another pulley 86 runs an endless belt 87. Pulley 86 is mounted fast on a short shaft 88 journalled in a bearing 89 secured fast to a suitable location on the tractor 21 (see Fig. 1). A bearing bracket 90 extends upwardly from the extreme inner end of the longitudinal frame member 4 and is braced adjacent its upper end portion by a cross bar 91 extending longitudinally inwardly of the frame 1 from the frame member 11. A shaft 92 is journalled in a bearing 93 fast on the bearing bracket 90. Shafts 88 and 92 are connected for common rotary movements by a coupling shaft 94 and universal joints 95. At its forward end, shaft 92 has secured fast thereon a sprocket 96 which drives a sprocket 97 by means of a link chain 98. The sprocket 97 is journalled in a bearing 99 fast on the bracket 90 and has secured thereto a crank 100 to which the pitman arm 20 is connected as indicated at 101. An idler sprocket 102 journalled to the bracket 90, as indicated at 103, is utilized to take up slack in the link chain 98.

Figure 4:
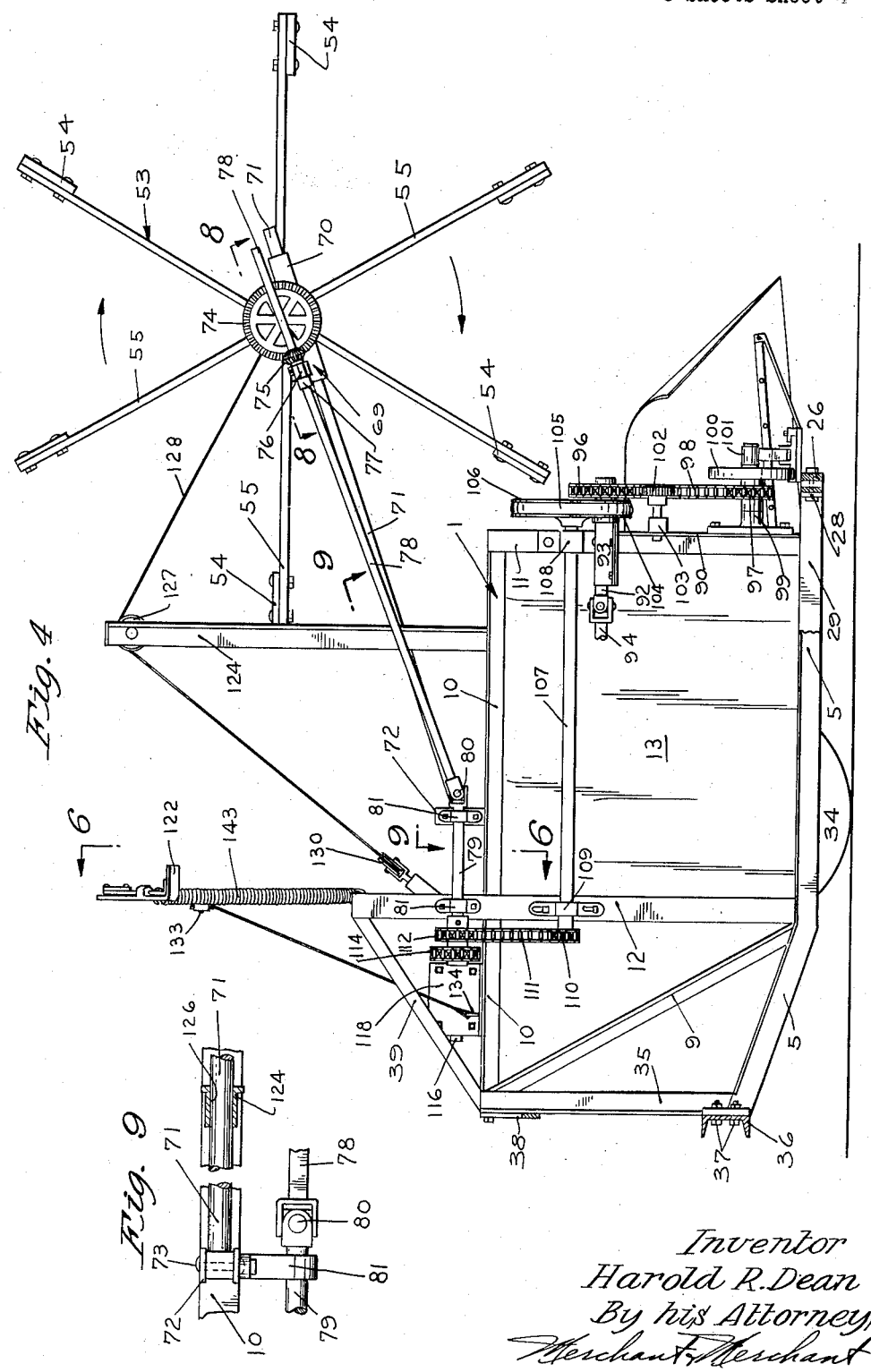
Fig. 4 is an enlarged view, partly in end elevation and partly in section, taken substantially on the line 4—4 of Fig. 2.

A pulley 104 is mounted fast on shaft 92 adjacent the sprocket 96 and drives an endless V-belt 105 which runs thereover and another pulley 106 fast on the front end of a transverse shaft 107, which shaft is journalled in bearings 108 and 109 rigidly secured to the frame members 11 and 12 respectively. A sprocket wheel 110 is mounted fast on the rear end of the transverse shaft 107 and drives a link chain 111 which runs thereover and over another sprocket 112 secured fast to shaft 79 adjacent its rear end. Rotation of the shaft 79 from the tractor through the power take-off shaft 84, belt 87, shafts 88, 94, 92, V-belt 105, shaft 107, and link chain 111 results in rotary movement of reel 53 in a clockwise direction with respect to Figs. 4 and 5 and in a counter-clockwise direction with respect to Fig. 3, as indicated by arrows thereon, through universal joint 80, shaft 78, and bevel gears 74 and 75.

The endless conveyor is driven by the shaft 79 through connections now to be described. A link chain 113 runs over a sprocket wheel 114 fast on the extreme rear end of the shaft 79 and over a sprocket wheel 115 fast on a shaft 116 journalled in bearings 117 that are mounted on a bracket 118 (see particularly Figs. 1, 3, and 4). The bracket 118 is secured by welding or the like to the rear end portion of transverse frame member 10. A V-belt 119 runs over a pulley 120 fast on the front end of the shaft 116 and over another pulley 121 on the jack shaft 48 and drives the conveyor roller 42 through sprockets 46 and 47 and link chain 45. The conveyor belt 40 is driven through mechanism above-described in a direction to feed material toward the opening 51, as indicated by arrows in Figs. 1, 2, and 7.

It is often desirable during a run of a machine through a field to change the elevation of the reel 53 with respect to the mower bar 17. I accomplish this by manipulation of a handle-equipped lever 122, which is pivotally secured to the frame 1, as indicated at 123, and flexible cable connections therebetween and pivoted arms 59 and 71. A pair of vertically-disposed masts 124 and 125 are rigidly secured to opposite ends of the main frame 1 and are preferably formed from angle iron or the like. Each of the masts 124 and 125 is formed from a pair of spaced angle irons which define channels 126 in which the pivoted arms 59 and 71 are adapted to move (see Figs. 2 and 9). A pair of pulleys 127 are journalled one each to the upper ends of the masts 124 and 125. A flexible cable 128 has one end secured fast to the bearing bracket 69, as indicated at 129, runs over pulley 127 at the upper end of mast 124, downwardly and rearwardly, to and over a pulley 130 journalled to the inner end of the main frame 1, and from thence over a pulley 131 journalled in a bracket 132 secured to the intermediate portion of the upper longitudinal frame member 2. From thence, cable 128 runs over a pulley 133 journalled to the intermediate portion of the handle lever 122 from whence it extends to an anchoring hook 134 fast on bearing bracket 118 where it is secured. A second flexible cable 135 has one end secured fast to an eyebolt 136 on the bearing block 57. Cable 135 runs over the pulley 127 journalled to the upper end of mast 125 and over a second pulley 137 journalled in a bracket 138 secured to the outer end of the upper longitudinal frame member 2. From thence, cable 135 extends toward the handle lever 122 and is spliced or otherwise secured to cable 128 as indicated at 139. Movement of the handle lever 122 from the right to the left with respect to Figs. 2 and 6 will raise the reel 53, while reverse movement of the lever 122 will lower reel 53. Handle lever 122 is provided with a spring-biased locking pin 140 which is adapted to engage any one of a plurality of notches 141 in a quadrant 142 secured to the frame 1. As an aid to the operator in raising the reel 53, I provide a tension spring 143 which has one end fastened to a portion of the handle-equipped lever 122, as indicated at 144, and its other end secured to one end portion of the quadrant 142, as at 145 (see particularly Figs. 2, 4, 5, and 6). The spring 143 biases the lever 122 toward a reel-lifting position and compensates for at least a part of the weight of reel 53 and supporting arms 59 and 71. It is important to note that the confinement of the pivoted arms 59 and 71 within the channels 126 of the masts 124 and 125 braces the arms 59 and 71 and the entire reel structure against wobbling movements longitudinally of the machine.

The pivotal connections 27 and 32 between the swather and the tractor 21 permit rocking movement of the swather on an axis longitudinally thereof, whereby to raise and lower the leading edge thereof so that the crop to be harvested may be cut at any desired height. This rocking movement is obtained by manipulation of a handle-equipped bell crank lever 146 which is pivoted at its intermediate portion 147 to an extension 148 of the anchoring bracket 23. A rigid link 149 has one end pivotally connected to one end of the bell crank lever 146 as at 150 and its other end pivoted to an upstanding lug 151 welded or otherwise secured to inner frame member 29. A spring-biased locking pin or rod 152 mounted on the lever 146 is adapted to engage any one of a plurality of notches 153 in a quadrant 154 fast on anchoring bracket 23 (see particularly Figs. 2 and 5). Movement of the lever 146 in a counterclockwise direction with respect to Fig. 5 will raise the forward edge of the swather, and movement in a clockwise direction will lower the same. The greater part of the weight of the swather lies forwardly of the pivotal connections 27 and 32, and the axis of the ground wheel 34. To compensate for a portion of the forward unbalance of the swather, I provide a relatively heavy tension spring 155 which is anchored at one end to an eyebolt 156 on the inner end frame member 29 and at its other end to the intermediate portion of bell crank lever 146.

As the swather traverses a field of material to be cut and windrowed, a swath of the hay or grain is mowed by the knives 18 on the mower bar 17 and falls upon the conveyor 40 from whence it is deposited upon the ground in an orderly windrow through the joint openings 16 and 51. Of course, hay or grain cut by the mower knives directly in front of the opening 51 will fall directly therethrough to the ground. If for any reason during the travel of the machine through a field, it is necessary to elevate or depress the mower structure, it is but necessary for the operator to manipulate the lever 146 without stopping any part of the operation of the machine. Also, the reel 53 may be quickly and easily raised or lowered to a desired height by manipulation of the handle lever 122 without disturbing the progress of the machine.

Setting of the reel 53 forwardly or rearwardly with respect to the mower bar 17 is determined by the type of crop to be cut, and once set does not need to be again adjusted until a different grain is to be harvested. Adjustment of the height of the entire swather with respect to the ground, as provided by setting of the bolt 32 in one of the holes 33 in the anchoring bracket 23, corresponding elevation of the pivot 27 in the anchoring bracket 32, and of raising or lowering the ground wheel 34, is effected prior to the harvesting operation and need not be changed for any one type of crop.

From the foregoing, it will be obvious that, during the passage of the machine through a field, the grain is mowed and laid in an orderly windrow where it will be ready for subsequent harvesting operations. Thus, my invention performs at one time the functions of a mower and a windrowing rake and the time required for accomplishing these operations is substantially reduced.

My invention has been thoroughly tested and found to be adequate for the accomplishment of the objects set forth; and, while I have shown a preferred embodiment of my invention, it will be understood that the same is capable of modification without departure from the spirit and scope of the invention as defined in the claims.

What I claim is:

1. In a device of the class described, an elongated frame, means for securing the same to a tractor to project laterally outwardly therefrom at right angles to the line of travel thereof, a cutter bar extending longitudinally of the frame adjacent the leading edge thereof, an endless conveyor extending longitudinally of the frame directly behind said cutter bar and terminating in spaced relation to the inner end of the cutter bar whereby to provide an outlet intermediate said conveyor and the inner end of said frame, means adapted to be connected to the power take-off of said tractor for reciprocating said cutter bar and driving said conveyor, a pair of arms pivotally secured to the frame in laterally-spaced relationship, a reel journalled in said arms adjacent their free ends, means associated with said first-mentioned means for rotating said reel, a pair of mast elements one each adjacent one of said pivoted arms, a pair of pulleys journalled one each to the upper end portions of one of said mast elements, a handle-equipped lever element pivoted to said frame adjacent the driver's seat of said tractor, flexible cables running over said pulleys and connecting the outer end portions of said pivoted arms with said lever whereby movements of said lever will cause raising and lowering movements of said arms and reel, the driving means for said reel including a shaft mounting said reel, a bearing bracket journalling one end portion of said shaft and adjustably mounted on one of said pivoted arms, a gear fast on said shaft adjacent said bearing bracket, a pinion journalled in said bearing bracket and meshing with said gear, a driving shaft keyed to said pinion for rotation therewith and for axial sliding movements with respect thereto, and driving connections between said shaft and said means adapted to be coupled to the power take-off of said tractor.

2. In a device of the class described, an elongated frame, means on one end of said frame for securing the same to the axle housing of a tractor so that said frame projects laterally outwardly therefrom, said means including anchoring members on the axle housing one adjacent each driving wheel and spaced brace members pivotally connecting the inner end of said frame with said anchoring members, a ground wheel supporting said frame at its free end, a cutter bar secured to said frame adjacent the leading edge thereof, said cutter bar being substantially co-extensive in length with said frame, a reel secured to said frame in overlying spaced relation to said cutter bar, an endless conveyor extending longitudinally of said frame directly behind said cutter bar at one end and terminating in spaced relation to the inner end of the cutter bar whereby to provide an outlet intermediate said conveyor and the inner end of said frame for material discharged from said conveyor, driving connections adapted to be connected to the power take-off of said tractor for simultaneously imparting reciprocating movements to said cutter bar, driving movements to said conveyor, and rotary movements to said reel, manual means including a handle-equipped lever adjacent the operator's seat on said tractor for imparting rocking movements to said frame for raising and lowering the cutter bar, manual means including a handle-equipped lever adjacent the operator's seat on said tractor for raising and lowering the reel with respect to the cutter bar, the axes of the pivotal connections between said anchoring members and said brace members being in substantial alignment with said ground wheel axis, said arms at their free ends being provided with alignable longitudinally-extended slots, axle portions on said reel extending through said slots, and clamping plates cooperating with said axle portions and said arms to adjustably secure said axle portions in a set position in said slots.

HAROLD R. DEAN.

REFERENCES CITED

The following references are of record in the file of this patent:

UNITED STATES PATENTS

| Number | Name | Date |
| --- | --- | --- |
| 1,312,389 | Converse | Aug. 5, 1919 |
| 2,215,178 | Hume et al. | Sept. 17, 1940 |
| 2,280,453 | Rucker et al. | Apr. 21, 1942 |
| 2,532,164 | Hansen et al. | Nov. 28, 1950 |